(12) United States Patent
Cho et al.

(10) Patent No.: US 10,021,233 B2
(45) Date of Patent: Jul. 10, 2018

(54) DIGITAL DEVICE AND METHOD FOR CONTROLLING THE SAME

(71) Applicant: LG ELECTRONICS INC., Seoul (KR)

(72) Inventors: Eunhyung Cho, Seoul (KR); Sinae Chun, Seoul (KR); Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 33 days.

(21) Appl. No.: 13/961,386

(22) Filed: Aug. 7, 2013

(65) Prior Publication Data

US 2015/0020081 A1 Jan. 15, 2015

(30) Foreign Application Priority Data

Jul. 11, 2013 (KR) ........................ 10-2013-0081591

(51) Int. Cl.
| | |
|---|---|
| *G06F 3/16* | (2006.01) |
| *G06F 3/041* | (2006.01) |
| *H04M 1/67* | (2006.01) |
| *H04W 4/12* | (2009.01) |
| *H04M 1/725* | (2006.01) |
| *G06F 9/54* | (2006.01) |
| *G06F 3/01* | (2006.01) |
| *G06F 3/14* | (2006.01) |
| *G06F 21/31* | (2013.01) |
| *H04W 4/00* | (2018.01) |

(Continued)

(52) U.S. Cl.
CPC ........ *H04M 1/72519* (2013.01); *G06F 1/163* (2013.01); *G06F 3/017* (2013.01); *G06F 3/041* (2013.01); *G06F 3/1423* (2013.01); *G06F 3/16* (2013.01); *G06F 9/542* (2013.01); *G06F 9/546* (2013.01); *G06F 21/316* (2013.01); *H04M 1/67* (2013.01); *H04M 1/7253* (2013.01); *H04M 1/72552* (2013.01); *H04W 4/008* (2013.01); *H04W 4/12* (2013.01); *H04M 2250/02* (2013.01); *H04W 88/02* (2013.01)

(58) Field of Classification Search
CPC . G06F 9/542; G06F 9/546; G06F 3/16; G06F 3/1423; G06F 3/041; G06F 21/316; G06F 3/017; G06F 1/163; H04M 1/72519; H04M 1/67; H04M 1/7253; H04M 1/72552; H04W 4/12; H04W 4/008
See application file for complete search history.

(56) References Cited

U.S. PATENT DOCUMENTS

| 5,960,367 A | * | 9/1999 | Kita ............................... 455/567 |
| 6,263,218 B1 | * | 7/2001 | Kita ............................... 455/567 |

(Continued)

FOREIGN PATENT DOCUMENTS

| CN | 101924823 A | 12/2010 |
| CN | 102239469 A | 11/2011 |

(Continued)

*Primary Examiner* — Charles E Anya
(74) *Attorney, Agent, or Firm* — Birch, Stewart, Kolasch & Birch, LLP

(57) ABSTRACT

A digital device and a method for controlling the same are disclosed, in which different kinds of information on an event is provided to a user depending on whether an external device paired with the digital device has identified a notification related to an event occurring in the digital device within a predetermined period.

12 Claims, 12 Drawing Sheets

(51) Int. Cl.
*G06F 1/16* (2006.01)
*H04W 88/02* (2009.01)

(56) References Cited

U.S. PATENT DOCUMENTS

| | | | |
|---|---|---|---|
| 8,208,979 B2* | 6/2012 | Yulo | 455/575.3 |
| 8,275,327 B2 | 9/2012 | Yi et al. | |
| 8,515,505 B1* | 8/2013 | Pattikonda | 455/575.6 |
| 8,787,006 B2* | 7/2014 | Golko | G06F 1/163 |
| | | | 361/679.03 |
| 8,862,166 B2 | 10/2014 | Kennard | |
| 9,235,241 B2 | 1/2016 | Newham et al. | |
| 9,569,625 B2 | 2/2017 | Dibona et al. | |
| 9,584,643 B2 | 2/2017 | Bok et al. | |
| 2002/0115478 A1* | 8/2002 | Fujisawa et al. | 455/567 |
| 2006/0026088 A1 | 2/2006 | Grossman et al. | |
| 2006/0135136 A1* | 6/2006 | Kim et al. | 455/414.1 |
| 2007/0265038 A1* | 11/2007 | Kim | H04M 1/7253 |
| | | | 455/567 |
| 2008/0070612 A1* | 3/2008 | Weinans | H04M 1/7253 |
| | | | 455/517 |
| 2008/0081594 A1* | 4/2008 | Lee | 455/412.2 |
| 2008/0120029 A1 | 5/2008 | Zelek et al. | |
| 2009/0177981 A1* | 7/2009 | Christie et al. | 715/758 |
| 2010/0112964 A1 | 5/2010 | Yi et al. | |
| 2010/0146437 A1 | 6/2010 | Woodcock et al. | |
| 2011/0059769 A1 | 3/2011 | Brunolli | |
| 2011/0300804 A1* | 12/2011 | Lu | 455/41.3 |
| 2012/0108215 A1* | 5/2012 | Kameli | 455/412.2 |
| 2012/0117507 A1* | 5/2012 | Tseng et al. | 715/774 |
| 2012/0218171 A1 | 8/2012 | Fujigaki | |
| 2012/0254987 A1* | 10/2012 | Ge | H04L 63/0492 |
| | | | 726/19 |
| 2012/0262388 A1 | 10/2012 | Huang et al. | |
| 2013/0040610 A1* | 2/2013 | Migicovsky et al. | 455/412.2 |
| 2013/0106684 A1 | 5/2013 | Weast et al. | |
| 2013/0135196 A1 | 5/2013 | Park et al. | |
| 2013/0222236 A1* | 8/2013 | Gardenfors et al. | 345/156 |
| 2013/0234850 A1* | 9/2013 | Lee | A61B 5/02 |
| | | | 340/539.12 |
| 2013/0244633 A1* | 9/2013 | Jacobs et al. | 455/415 |
| 2013/0273977 A1* | 10/2013 | Kim et al. | 455/566 |
| 2013/0303087 A1* | 11/2013 | Hauser et al. | 455/41.2 |
| 2014/0137049 A1 | 5/2014 | Jung et al. | |
| 2014/0244505 A1 | 8/2014 | Kim | |
| 2014/0273975 A1* | 9/2014 | Barat | G06F 15/17312 |
| | | | 455/412.2 |
| 2014/0298353 A1* | 10/2014 | Hsu et al. | 719/313 |

FOREIGN PATENT DOCUMENTS

| | | |
|---|---|---|
| CN | 102938787 A | 2/2013 |
| CN | 103076951 A | 5/2013 |
| WO | WO 2008/031635 A1 | 3/2008 |
| WO | WO 2009/097555 A2 | 8/2009 |
| WO | WO 2010/033944 A2 | 3/2010 |

* cited by examiner

DIGITAL DEVICE AND METHOD FOR CONTROLLING THE SAME

This application claims the benefit of the Korean Patent Application No. 10-2013-0081591, filed on Jul. 11, 2013, which is hereby incorporated by reference as if fully set forth herein.

BACKGROUND OF THE INVENTION

Field of the Invention

The present specification relates to a digital device and a method for controlling the same, and more particularly, to a digital device and a method for controlling the same, in which different kinds of information on an event is provided to a user depending on whether an external device paired with the digital device has identified a notification related to an event occurring in the digital device within a predetermined period.

Discussion of the Related Art

With the development of the technology, the development of a wearable computer has been accelerated. The wearable computer means a computer that may be worn by a user like clothes, watch, glasses and accessories.

Although a smart phone and a tablet PC may be used conveniently by using a finger or a touch means such as a touch pen, there is inconvenience in that a user should carry it by putting it in his or her pocket or bag, or should hold it in his or her hand. On the other hand, since the user may wear the wearable computer on his or her wrist or wear it like glasses, it is easier to carry the wearable computer than the smart phone or the tablet PC.

Particularly, as kinds of the wearable computer, various products of a wrist watch, that is, a smart watch, which may be used by a user to use various services such as a diary, message, notification, and stock quotations, have been commercialized.

In the meantime, the smart watch may be used in association with the digital device such as the smart phone. In this case, the user may identify a notification of an event, which occurs in the digital device, through the digital device or an external device such as a smart watch, which is paired with the digital device. Accordingly, the digital device needs to display information on the event differently depending on whether the user has identified the notification of the event through the external device and the user uses the digital device within a certain time after identifying the notification of the event.

SUMMARY OF THE INVENTION

Accordingly, the present specification is directed to a digital device and a method for controlling the same, which substantially obviate one or more problems due to limitations and disadvantages of the related art.

An object of the present specification is to provide a digital device and a method for controlling the same, in which event occurrence information or event detail information is provided depending on whether a user has identified a notification of an event occurring in the digital device through an external device paired with the digital device if the external device provides the user with the notification of the event.

Another object of the present specification is to provide a digital device and a method for controlling the same, in which event detail information is provided immediately if a user uses the digital device within a predetermined period from the time when the user identifies a notification of an event occurring in the digital device.

Still another object of the present specification is to provide a digital device and a method for controlling the same, in which event occurrence information is provided if a user uses the digital device after a predetermined period from the time when the user identifies a notification of an event occurring in the digital device.

Further still another object of the present specification is to provide a digital device and a method for controlling the same, in which detail information of an event occurring most recently is provided if a user uses the digital device within a predetermined period from the time when the user identifies a plurality of notifications of a plurality of events occurring in the digital device.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a digital device paired with an external device comprises a sensor unit configured to sense a user input and forward a signal based on the sensed result to a processor; a display unit configured to display information; and the processor configured to control the sensor unit and the display unit, wherein the processor is further configured to: detect occurrence of an event, generate a notification notifying a user that the event has occurred, transmit the notification to the external device, display detail information for the event, if a check signal for the notification is received from the external device and an input signal is detected within a predetermined period from a time when the check signal is received, and displays occurrence information for the event if the processor detects the input signal for the notification without the check signal for the notification.

In another aspect of the present specification, a method for controlling a digital device paired with an external device comprises the steps of detecting occurrence of an event; generating a notification notifying a user that the event has occurred; transmitting the notification to the external device; displaying detail information for the event, if a check signal for the notification is received from the external device and an input signal is detected within a predetermined period from a time when the check signal is received; and displaying occurrence information for the event, if the digital device detects the input signal for the notification without the check signal for the notification.

According to one embodiment, if the external device paired with the digital device provides the user with a notification of an even occurring in the digital device, the digital device may provide event occurrence information or event detail information depending on whether the user has identified the notification of the event through the external device. Accordingly, the digital device may provide information desired by the user in accordance with the user's intention.

Also, according to another embodiment, if the user uses the digital device within a predetermined period from the time when the user identifies a notification of an event occurring in the digital device, through the external device, the digital device may immediately provide detail information of the event. In other words, the digital device may provide an environment where the user may view desired detail information immediately without any inconvenient procedure, by identifying intention of the user who desires to view the detail information of the event.

Also, according to still another embodiment, if the user uses the digital device after a predetermined period from the time when the user identifies a notification of an event occurring in the digital device, through the external device, the digital device may provide occurrence information of the event. In other words, the digital device may provide an environment where the user may implement a desired function immediately, by identifying intention of the user who does not need to immediately view the detail information of the event.

More detailed advantageous effects will be described hereinafter.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Moreover, although the embodiments will be described in detail with reference to the accompanying drawings and the disclosure described by the drawings, it is to be understood that the present specification is not limited by such embodiments.

In the meantime, a digital device disclosed in this specification may include various types of devices, such as a personal computer (PC), a personal digital assistant (PDA), a notebook computer, a tablet PC, and a smart phone, which may display images.

Figure 1:
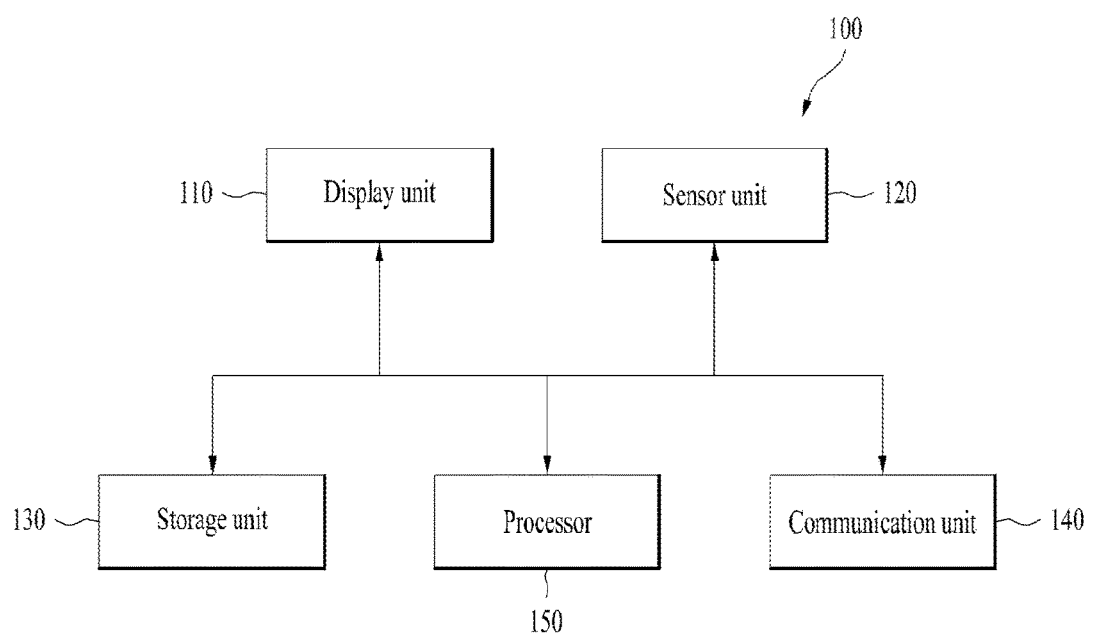
FIG. 1 is a functional block diagram illustrating a digital device according to one embodiment.

FIG. 1 is a functional block diagram illustrating a digital device according to one embodiment. FIG. 1 is only exemplary and some modules may be deleted or new modules may be additionally provided in accordance with the need of the person with ordinary skill in the art.

As shown in FIG. 1, a digital device 100 according to one embodiment may include a display unit 110, a sensor unit 120, a storage unit 130, a communication unit 140, and a processor 150.

The display unit 110 may output image data on a display screen. Also, the display unit 110 may output the images on the basis of contents or applications implemented by the processor 150 or a control command of the processor 150.

The sensor unit 120 may sense a periphery environment of the digital device 100 by using at least one sensor provided in the digital device 100, and may forward the sensed result to the processor 150 as a signal type. Also, the sensor unit 120 may sense a user input and forward a signal based on the sensed result to the processor 150. At this time, the processor 150 may detect a signal generated by the user input, such as a signal forwarded from a touch sensor, among many signals received therein.

Accordingly, the sensor unit 120 may include at least one sensing means. In one embodiment, the at least one sensing means may include a gravity sensor, a terrestrial magnetism sensor, a motion sensor, a gyroscope sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a video sensor, a global positioning system (GPS) sensor, a touch sensor, and a grip sensor.

As a result, the sensor unit 120 may detect an input signal for the digital device 100. In this case, the input signal for the digital device 100 may include eye input, touch input, voice input, and gesture input for the digital device 100. This will be described in detail with reference to FIG. 4.

Also, the sensor unit 120 refers to the aforementioned various sensing means, and may sense various inputs of a user and the environment of the digital device 100 and forward the sensed result to the processor 150, whereby the processor 150 may perform the operation based on the sensed result. Also, the aforementioned sensors may be included in the digital device 100 as separate elements, or may be incorporated into at least one element.

Also, if the aforementioned display unit 110 includes a touch sensitive display, the digital device 100 may sense a user input such as a touch input through the display unit 120.

Accordingly, the processor 150 may recognize the signal based on the user input forwarded from at least one of the sensor unit 120 and the display unit 110 and control the digital device 100 in accordance with the signal.

In other words, the processor 150 may detect the signal through at least one of the sensor unit 120 and the display unit 120 among the signals forwarded from the units of the digital device. Namely, the processor 150 may detect the signal generated by the user input received from a specific sensor, among many signals received therein. For example, if the sensor unit 120 senses the input of the user, the processor 150 may detect the signal corresponding to the input by using the sensed result.

Hereinafter, if each step or operation performed by the digital device starts or is performed through the user input, it is to be understood that the procedure of generating the signal in accordance with the user input is included in the aforementioned description.

Also, it may be expressed that the processor controls the digital device or the units included in the digital device in accordance with the user input. The processor may be described to mean the digital device.

The storage unit 130 may store contents displayed by the digital device 100. Also, the storage unit 130 may store detail information or occurrence information of an event occurring in the digital device 100. The event may include at least one of a text message receiving event, a mail receiving event, a call receiving event, and a schedule notification event.

Also, the storage unit 130 may store information on a notification notifying the user of occurrence of the event. The notification may include at least one of hearing information, visual information, tactile information and vibration information. As a result, the digital device 100 may provide the user with the notification of the event in the form of at least one of alarm sound, icon, tactile feedback and vibration.

In this case, if the notification includes visual information, the visual information may include at least one of graphic object (for example, icon) corresponding to the event, title information of the event, accumulated information of occurrence of the event, subject information of the event, and time information for the occurrence of the event. This will be described in detail with reference to FIG. 5.

Also, the storage unit 130 may temporarily store data received from an external device through the communication unit 140. In other words, the storage unit 130 may be used for buffering for outputting the data, which are received from the external device, from the digital device 100.

The communication unit 140 may transmit and receive data to and from the external device by performing communication with the external device by using various protocols. Also, the communication unit 140 may transmit and receive digital data such as contents and applications to and from an external network by accessing the external network through the wire or wireless.

Accordingly, the digital device 100 may transmit at least one of occurrence information of an event, detail information of an event, and a notification to the external device through the communication unit 140. Also, the digital device 100 may receive a check signal of the notification from the external device through the communication unit.

Also, the digital device 100 may perform pairing with the external device through the communication unit 140. Also, the digital device 100 may access communication with the external device through pairing. Accordingly, the communication unit 140 may transmit a signal for initiating the notification to the external device if the digital device 100 is paired with the external device.

Although not shown in FIG. 1, the digital device may include audio input and output units or a power unit.

The audio output unit (not shown) includes an audio output means such as a speaker and earphone. Also, the audio output unit may output voice on the basis of contents implemented in the processor 150 or the control command of the processor 150. At this time, the audio output unit may selectively be provided on the digital device 100.

The power unit (not shown) is a power source connected with a battery inside the digital device 100 or an external power, and may supply the power to the digital device 100.

Also, the digital device 100 is shown in FIG. 1 as a block diagram. In FIG. 1, respective blocks are shown to logically identify the elements of the digital device. Accordingly, the aforementioned elements of the digital device may be provided as one chip or a plurality of chips in accordance with design of the digital device.

Figure 2:
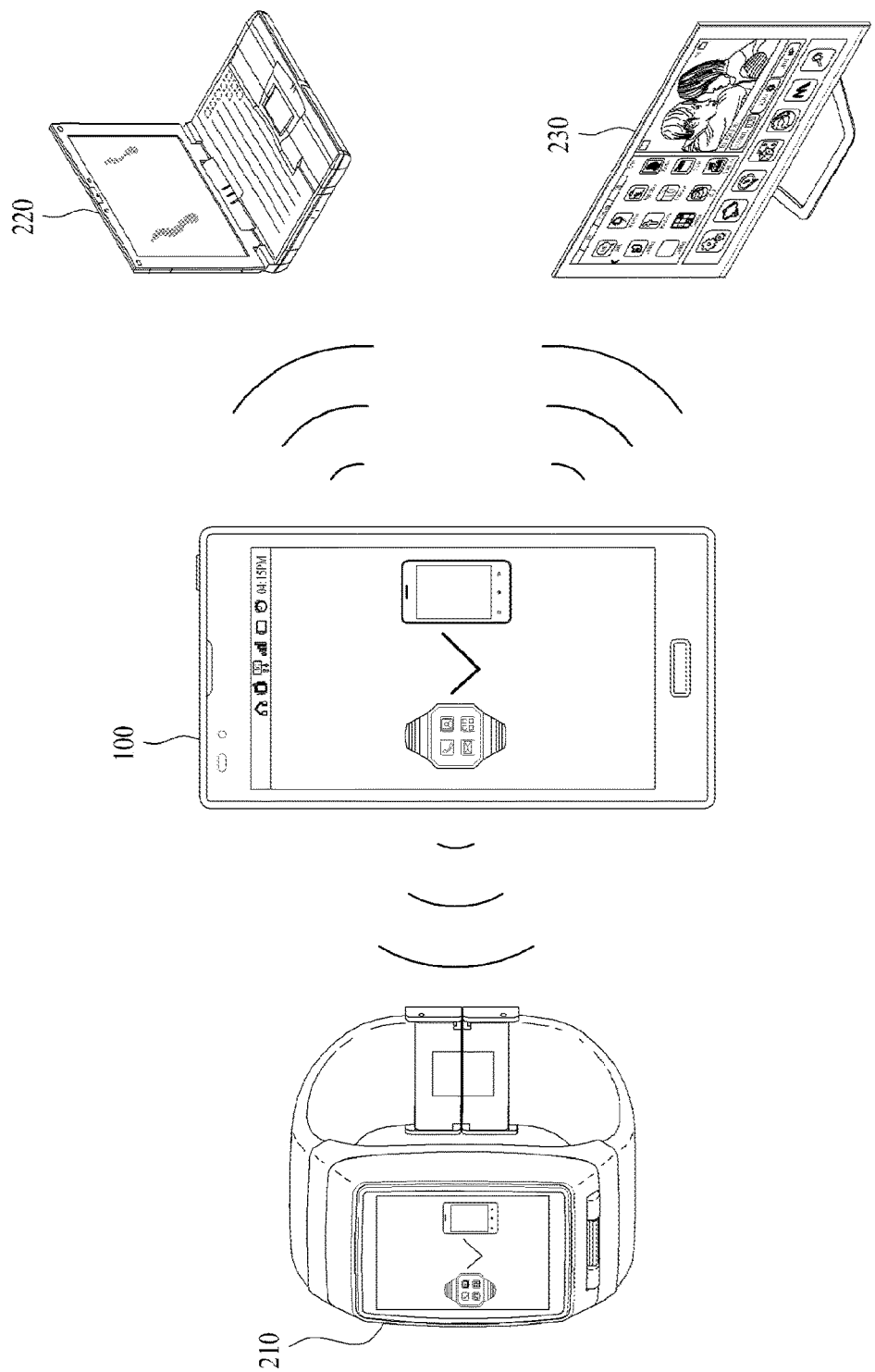
FIG. 2 is a diagram illustrating external devices that may be paired with a digital device in accordance with one embodiment.

FIG. 2 is a diagram illustrating external devices that may be paired with a digital device in accordance with one embodiment.

As shown in FIG. 2, the digital device 100 may perform communication with various types of external devices 210, 220 and 230. The digital device 100 may perform pairing with a specific one of the external devices 210, 220 and 230.

Accordingly, the external device that may be paired with the digital device is a device that may perform communication with the digital device 100, and its examples may include a smart watch 210, a notebook computer 220, and an Internet protocol television (IPTV) 230.

In the meantime, the digital device 100 may perform pairing with the plurality of external devices 210, 220 and 230. In this case, the digital device 100 may selectively transmit and receive data to and from one of the plurality of external devices 210, 220 and 230 by performing communication with the corresponding external device through pairing.

Figure 3:
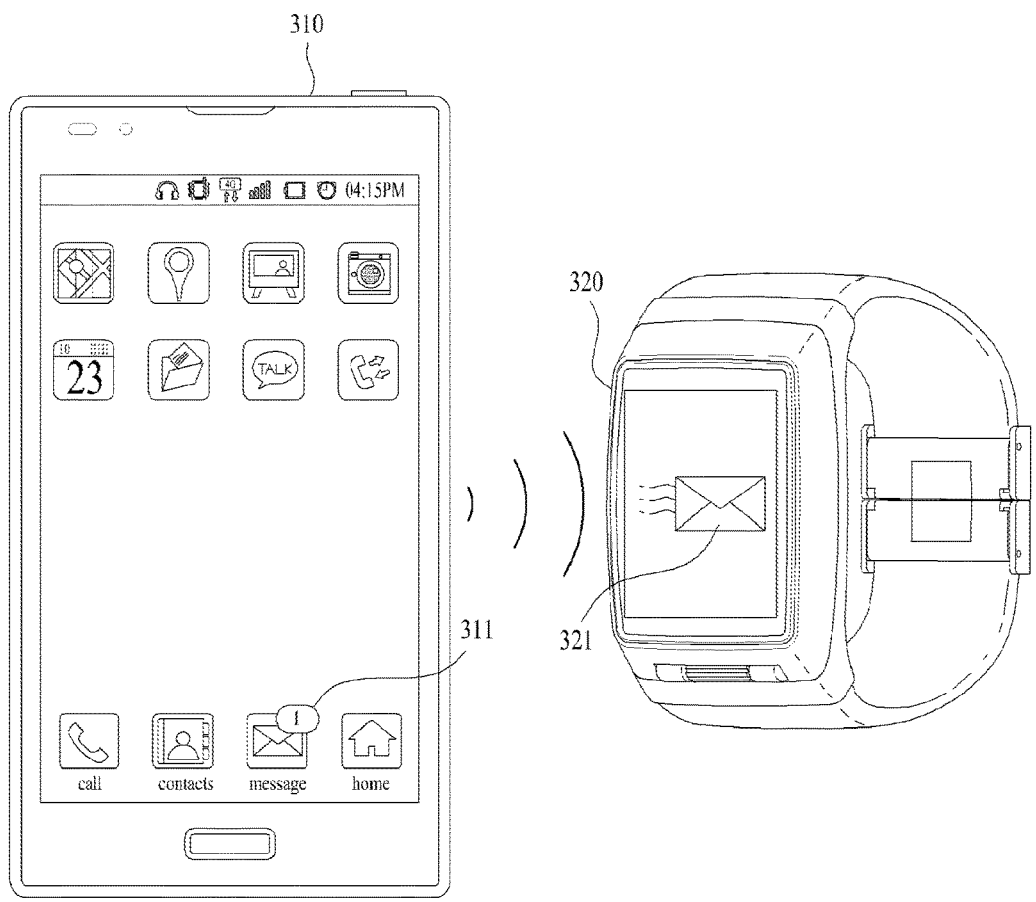
FIG. 3 is a diagram illustrating a digital device and an external device paired with the digital device in accordance with one embodiment.

FIG. 3 is a diagram illustrating a digital device and an external device paired with the digital device in accordance with one embodiment. In one embodiment of FIG. 3, an external device 320 paired with a digital device 310 is a smart watch.

Pairing represents connection for data transmission and reception between the digital device 310 and the external device 320. If pairing is performed, the digital device 310 and the external device 320 may bi-directionally transmit and receive data to and from each other by performing communication access.

In this specification, the digital device 310 may perform pairing with the external device 320 by using the communication unit. At this time, pairing may be performed through Bluetooth, near field communication field (NCF), etc.

Also, pairing may be performed by a user input through the digital device 310 or the external device 320. At this time, the user input may include a touch input, a voice input, etc. For example, the digital device 310 may provide a separate button or user interface for communication access with the external device 320. Also, the user may perform communication access between the digital device 310 and the external device 320 through the user input based on the button or user interface.

If communication access is performed, the digital device 310 may transmit and receive data to and from the external device 320 in a state that session is opened. Accordingly, the digital device 310 may detect an event occurring therein, and may share information related to occurrence of the event with the external device.

For example, the digital device 310 may detect a text message receiving event. The digital device 310 that has detected occurrence of the event may generate a notification 311 notifying the user that the event has occurred. The notification may include visual information as described above. Accordingly, the notification may include a graphic object corresponding to the event and accumulated information of occurrence of the event.

Also, the digital device 310 may transmit the notification to the external device 320. As a result, as shown in FIG. 3, the external device 320 may provide the user with the received notification 321. As shown in FIG. 3, the notification 321 may be provided in the form of visual information such as icon, and may be provided together with tactile feedback or vibration. Also, the notification may be provided in the form of hearing information such as alarm sound or voice message, and various modifications may be made in the notification in accordance with a rule previously set in the external device.

In the meantime, as described above, the digital device may perform pairing with various external devices that may perform communication. However, for convenience of description, the case where the external device paired with the digital device is a smart watch will be described as a main embodiment.

Figure 4:
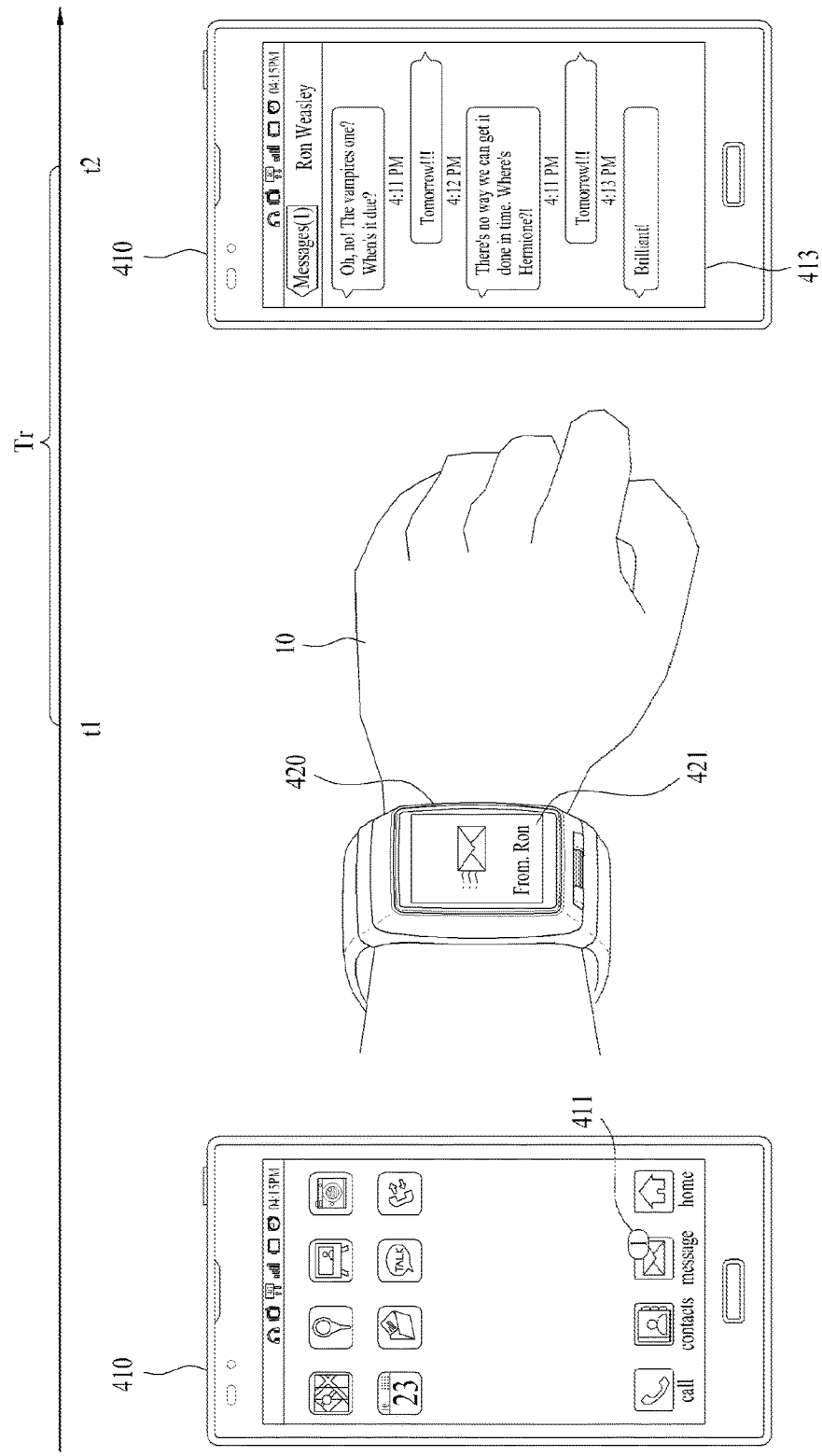
FIG. 4 is a diagram illustrating an example of a digital device that provides detail information of an event if a user identifies a notification through an external device.

FIG. 4 is a diagram illustrating an example of a digital device that provides detail information of an event if a user identifies a notification through an external device. In FIG. 4, a text message receiving event will be described as a main embodiment of the event.

The digital device 410 may detect occurrence of the event, and may generate a notification 411 notifying the user that the event has occurred. Although the notification provided in the form of visual information will be described in FIG. 4, the notification is not limited to the embodiment of FIG. 4.

In the meantime, the user does not always hold the digital device 410 in his or her hand. Namely, if the user puts the digital device 410 in his or her pocket or bag, the user may not identify the notification in real time.

Accordingly, the digital device 410 according to one embodiment may transmit the notification to the external device paired therewith, whereby the user may identify the notification through the external device 420 not the digital device 410 at any time.

As a result, the digital device 410 may transmit the notification to the external device 420. The external device 420 may provide the user with the received notification as it is or modify the received notification to various forms such as vibration and alarm and then provide the user with the modified notification.

At this time, if the user 10 identifies the notification 421 of the external device 420 (time t1), the external device 420 may transmit a check signal to the digital device 410.

The external device 420 may note that the user 10 has identified the notification 421 by detecting motion of an arm of the user 10 who wears the external device 420, a face of the user 10, etc. Also, through a touch input signal, a voice input signal and a gesture input signal of the notification 421, the external device may note that the user 10 has identified the notification 421.

As described above, the acknowledgement signal transmitted from the external device 420 to the digital device 410 may be generated if the external device 420 detects that the user identifies the notification transmitted to the external device 420 in accordance with a previously set rule. In other words, the acknowledgement signal is not a check signal indicating the external device 420 has received the notification from the digital device 410, but is the signal generated when the user detects the received notification.

If the digital device 410 receives the acknowledgement signal for the notification 421 from the external device 420 and detects the input signal within a predetermined period Tr from the time (t1) when the acknowledgement signal is received, it may display detail information 413 for the event.

The detail information for the event may include at least one of contents of a text message corresponding to the event, contents of a mail, caller information, and contents of a schedule. Accordingly, in FIG. 4, the digital device 410 displays contents of the text message corresponding to the event as the detail information 413 of the event.

If the user 10 identifies the notification 421 transmitted to the external device 420 and views the digital device 410 within the predetermined period Tr, it may be regarded that the user intends to identify the contents of the notification. Accordingly, if the digital device 410 detects its input signal (time t2), it may display detail information of the event to provide contents corresponding to the user's intention.

At this time, the input signal may be generated by a previously set operation desired by the user to use the digital device 410. This will be described in detail with reference to FIG. 5.

Figure 5:
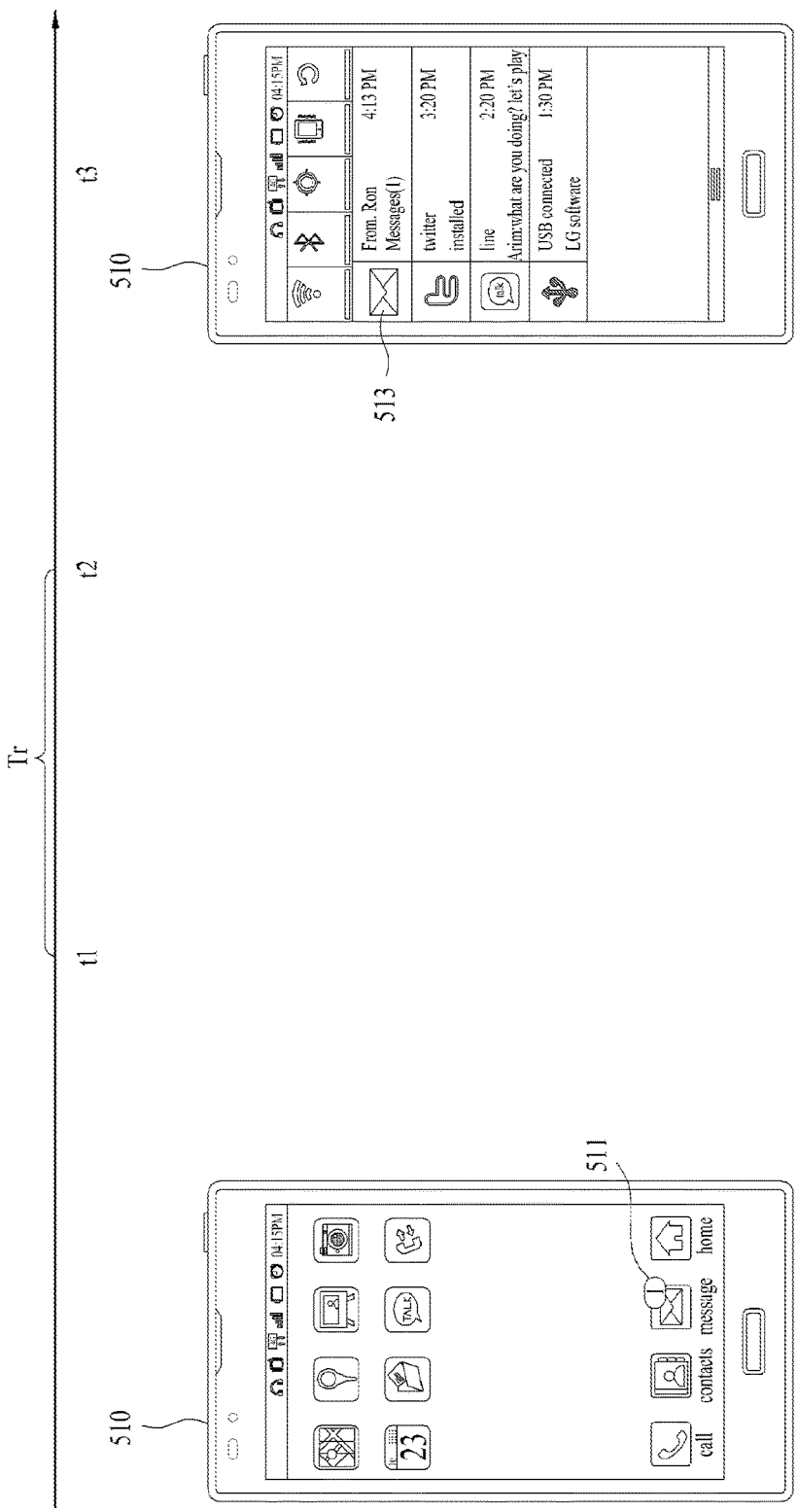
FIG. 5 is a diagram illustrating an example of a digital device that provides occurrence information of an event if a user does not identify a notification through an external device.

FIG. 5 is a diagram illustrating an example of a digital device that provides occurrence information of an event if a user does not identify a notification through an external device. In the same manner as FIG. 4, a text message receiving event will be described as a main embodiment.

The digital device 510 may detect occurrence of the event, and may generate a notification 511 notifying the user that the event has occurred. Although the notification provided in the form of visual information will be described in FIG. 5, the notification is not limited to the embodiment of FIG. 5.

Also, the digital device 510 according to one embodiment may transmit the notification to the external device paired therewith (time t1), whereby the user may identify the notification through the external device at any time.

However, the user may not identify the notification by using the external device for a predetermined period Tr. If the digital device 510 does not receive a check signal for the notification transmitted from the external device and detects an input signal (time t3), it may display occurrence information 513 of the event.

The occurrence information of the event indicates that the event has occurred, and may include at least one of a graphic object (for example, icon) corresponding to the event, title information of the event, accumulated information of occurrence of the event, subject information of the event, and time information for the occurrence of the event.

For example, in case of the text message receiving event, at least one of an icon corresponding to the text message, a part of the text message, the number of receiving times of the text message, a sender of the text message, and time information on the time when the text message is received may be displayed as the occurrence information of the event.

If the user views the digital device 510 without identifying the notification transmitted to the external device, the user does not know that the event has occurred. Accordingly, if the digital device 510 detects its input signal, it may display the occurrence information of the event to notify the user that the event has occurred. As a result, the digital device 510 may provide the user with an opportunity for selecting a specific event of which detail information is desired by the user, by using the occurrence information of the event.

At this time, the input signal may include a signal generated by a previously set operation desired by the user to use the digital device 510.

For example, the input signal may be generated if the display unit of the digital device 510 is turned on from the off state. Also, the input signal may be generated if the digital device 510 detects the user's gaze for the digital device or a predetermined motion of the user. Also, the input signal may be generated if the digital device detects a touch input of the user corresponding to the graphic object (for example, icon) corresponding to the notification.

In other words, if the display unit is turned off as the user does not use the digital device 510 for a certain time after the event occurs and then turned on in accordance with the input signal generated by the user, the digital device 510 may display the occurrence information of the event.

Alternatively, if the user's gaze or a predetermined motion of the user is detected, the digital device 510 may display the occurrence information of the event, whereby the user may recognize the occurrence of the event and input a signal for viewing detail information of the event.

Figure 6:
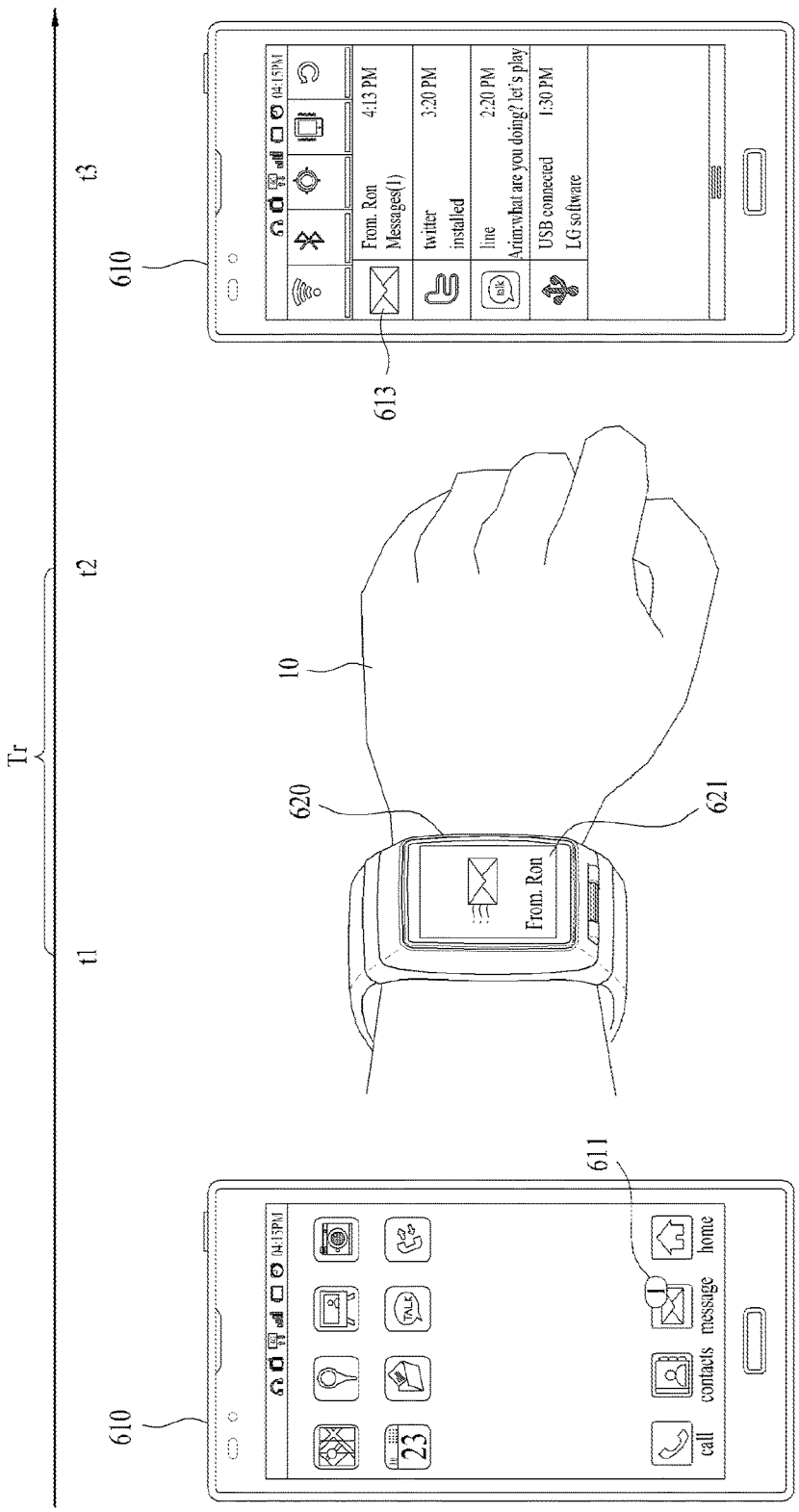
FIG. 6 is a diagram illustrating an example of a digital device that provides occurrence information of an event if a user identifies a notification through an external device.

FIG. 6 is a diagram illustrating an example of a digital device that provides occurrence information of an event if a user identifies a notification through an external device. In the same manner as FIG. 4, a text message receiving event will be described as a main embodiment.

The digital device 610 may detect occurrence of the event, and may generate a notification 611 notifying the user that the event has occurred. Although the notification provided in the form of visual information will be described in FIG. 6, the notification is not limited to the embodiment of FIG. 6.

Also, the digital device 610 according to one embodiment may transmit the notification to the external device 620 paired therewith (time t1), whereby the user may identify the notification through the external device at any time. Accordingly, the digital device 610 may transmit the notification to the external device 620.

At this time, if the user 10 identifies the notification 621 through the external device 620 (time t1), the external device 620 may transmit the acknowledgement signal to the digital device 610. This has been described in FIG. 4, and its detailed description will be omitted.

However, if the digital device 610 receives the acknowledgement signal of the notification 621 from the external device 620 (time t1) and detects the input signal after a predetermined period Tr from the time when the acknowledgement signal is received, it may display occurrence information 613 of the event.

If the user 10 identifies the notification 621 transmitted to the external device 620 and views the digital device 610 after the predetermined period Tr, it may be regarded that the user intends to perform other function of the digital device 610 rather than identify the contents of the notification. Accordingly, if the digital device 610 detects its input signal (time t3), it may display occurrence information of the event to allow the user to use its other function and to notify the user that the event has occurred. At this time, since the input signal is the same as that of FIG. 5, its detailed description will be omitted.

Figure 7:
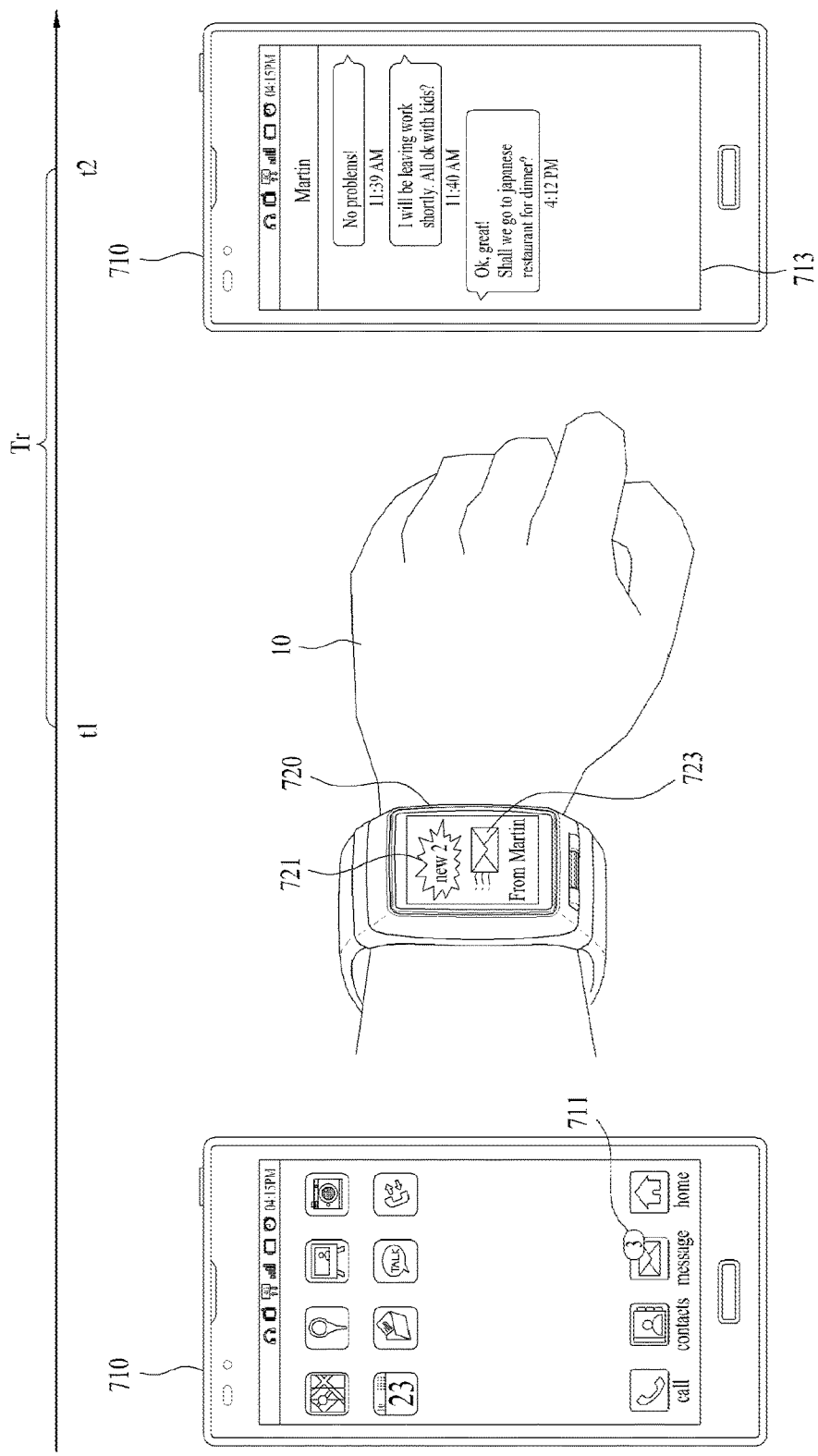
FIG. 7 is a diagram illustrating an example of a digital device that provides detail information of a plurality of events if a user identifies a notification through an external device.

FIG. 7 is a diagram illustrating an example of a digital device that provides detail information of a plurality of events if a user identifies a notification through an external device. In the same manner as FIG. 4, a text message receiving event will be described as a main embodiment.

The digital device 710 may detect occurrence of the event, and may generate a notification notifying the user that the event has occurred. However, unlike the aforementioned embodiment, a plurality of events may occur. In other words, the event may include a first event, a second event, and a third event, which occur in due order. Accordingly, the notification may include a first notification corresponding to the first event, a second notification corresponding to the second event, and a third notification corresponding to the third event. The notification notifying the event occurrence in the form of vibration or alarm sound may be provided by being divided into the first notification, the second notification and the third notification in accordance with the occurrence of the event.

However, the user may not identify the notification provided by the digital device 710 timely. As a result, as shown in FIG. 7, the digital device 710 may provide one notification 711, which includes accumulated information of the occurring event, without dividing the notification into the first notification, the second notification and the third notification.

Also, the digital device 710 according to one embodiment may transmit the notification to the external device 720 paired therewith, whereby the user may conveniently identify the notification through another external device at any time.

At this time, the external device may provide the notification by dividing the notification into a notification 723 corresponding to the third event, which occurs most recently, and a notification 721 corresponding to the first and second events, which occur before the occurrence of the third event.

Also, if the user 10 identifies the notification 723 through the external device 720, the external device 720 may transmit an acknowledgment signal to the digital device 710 (time t1). Since this has been described with reference to FIG. 4, its detailed description will be omitted.

By detecting motion of the arm of the user 10 who wears the external device 720 and the face of the user 10, the external device 720 may know that the user has identified the notification 723. Also, through a touch input signal, voice input signal and gesture input signal of the notification 723, the external device may know that the user has identified the notification 723.

As described above, the acknowledgement signal transmitted from the external device 720 to the digital device 710 may be generated if the external device 720 detects that the user checks the notification transmitted to the external device 720 according to a predetermined method.

If the digital device 710 receives the acknowledgement signal for the notification 723 from the external device 720

(time t1) and detects the input signal within a predetermined period Tr from the time when the acknowledgement signal is received, it may display detail information 713 for the event.

At this time, the detail information for the event may be the detail information of the third event. In other words, if the digital device 710 detects the input signal within the predetermined period Tr from the time (t1) when the acknowledgement signal for the third notification 723 corresponding to the third event is received from the external device 720, the digital device 710 may display the detail information 713 for the third event. Since the detail information of the event has been described with reference to FIG. 4, its detailed description will be omitted.

If the user 10 identifies the notification 723 transmitted to the external device 720 and views the digital device 710 within the predetermined period Tr, it may be regarded that the user intends to identify the contents of the notification. In particular, if the user uses the digital device 710 within the predetermined period Tr after identifying the last notification 723 in a state that the user does not respond to the notification 721, it may be regarded that the user intends to view detail information of the event corresponding to the last notification 723. Accordingly, if the digital device 710 detects its input signal (time t2), it may display the detail information of the latest event, to provide contents corresponding to the user's intention.

Figure 8:
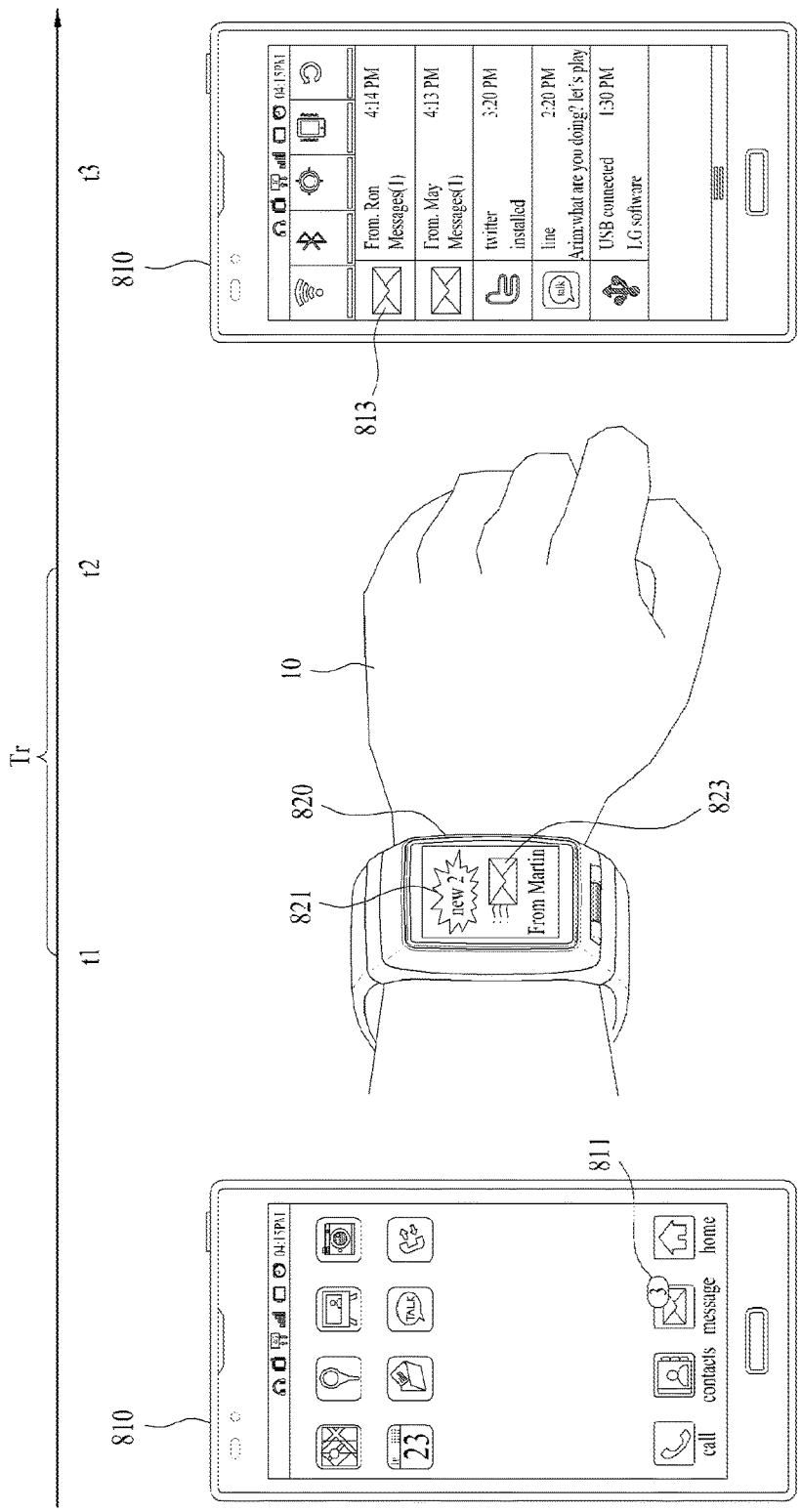
FIG. 8 is a diagram illustrating an example of a digital device that provides occurrence information of a plurality of events if a user identifies a notification through an external device.

FIG. 8 is a diagram illustrating an example of a digital device that provides occurrence information of a plurality of events if a user identifies a notification through an external device. In the same manner as FIG. 4, a text message receiving event will be described as a main embodiment. Also, in the same manner as FIG. 7, a plurality of events occurs in accordance with one embodiment.

The digital device 810 may detect occurrence of the event, and may generate a notification 811 notifying the user that the event has occurred. The event may include a first event, a second event, and a third event, which occur in due order. Accordingly, the notification may include a first notification corresponding to the first event, a second notification corresponding to the second event, and a third notification corresponding to the third event. The notification notifying the event occurrence in the form of vibration or alarm sound may be provided by being divided into the first notification, the second notification and the third notification in accordance with the occurrence of the event.

However, the user may not identify the notification provided by the digital device 810 immediately at that time. As a result, as shown in FIG. 8, the digital device 810 may provide one notification 811, which includes accumulated information of the occurring event, without dividing the notification into the first notification, the second notification and the third notification.

Also, the digital device 810 according to one embodiment may transmit the notification to the external device 820 paired therewith, whereby the user may conveniently identify the notification through another external device at any time.

At this time, the external device 820 may provide the notification by dividing the notification into a notification 823 corresponding to the third event, which occurs most recently, and a notification 821 corresponding to the first and second events, which occur before the occurrence of the third event.

Also, if the user 10 identifies the notification 823 through the external device 820, the external device 820 may transmit an acknowledgment signal to the digital device 810 (time t1). Since this has been described with reference to FIG. 4, its detailed description will be omitted.

If the digital device 810 receives the acknowledgement signal for the notification 823 from the external device 820 (time t1) and detects the input signal after a predetermined period Tr from the time when the acknowledgement signal is received, it may display occurrence information 813 for the event.

If the user 10 identifies the notification 823 transmitted to the external device 820 and views the digital device 810 after the predetermined period Tr, it may be regarded that the user intends to perform other function of the digital device 810 rather than identify the contents of the notification. Accordingly, if the digital device 810 detects its input signal (time t3), it may allow the user to use its other function.

However, the digital device 810 may not assure that the user has identified the first event and the second event. Accordingly, the digital device 810 may display occurrence information on the first event and the second event to notify the user that the events have occurred. Also, since the digital device 810 knows that the user has identified the occurrence of the third event, it may not display the occurrence information of the third event.

As described above, if the digital device 810 detects the input signal (time t3) after the predetermined period Tr from the time when the acknowledgement signal for the notification 823 corresponding to the third event is received, it may display the occurrence information on the first event and the second event.

In this way, if the digital device 810 detects the input signal (time t3) after the predetermined period Tr from the time when the acknowledgement signal for the notification 823 corresponding to the third event is received, it displays the occurrence information on the events but does not display detail information on the events. In this case, the user who desires to view detail information on the events after the predetermined period Tr may feel inconvenience. Accordingly, to solve such inconvenience, the external device may provide an indicator indicating the predetermined period Tr from the current time.

For example, if the external device 820 detects (time t1) that the user identifies the notification through the external device 820, the external device 820 may provide the remaining time from the detecting time t1 to the time t2 after the predetermined period. In other words, the external device 820 may calculate the remaining time from the current time to the time t2 and provide the calculated remaining time to the user.

In the meantime, as shown in FIG. 8, if the digital device 810 displays occurrence information of the notification, it may display its previously set background image together with the occurrence information of the notification. Accordingly, the user may receive detail information of the event by inputting the occurrence information of the event. Also, the user may input an object corresponding to a function of the digital device 810, which is included in the previously set background image, to use the function of the digital device 810.

Figure 9:
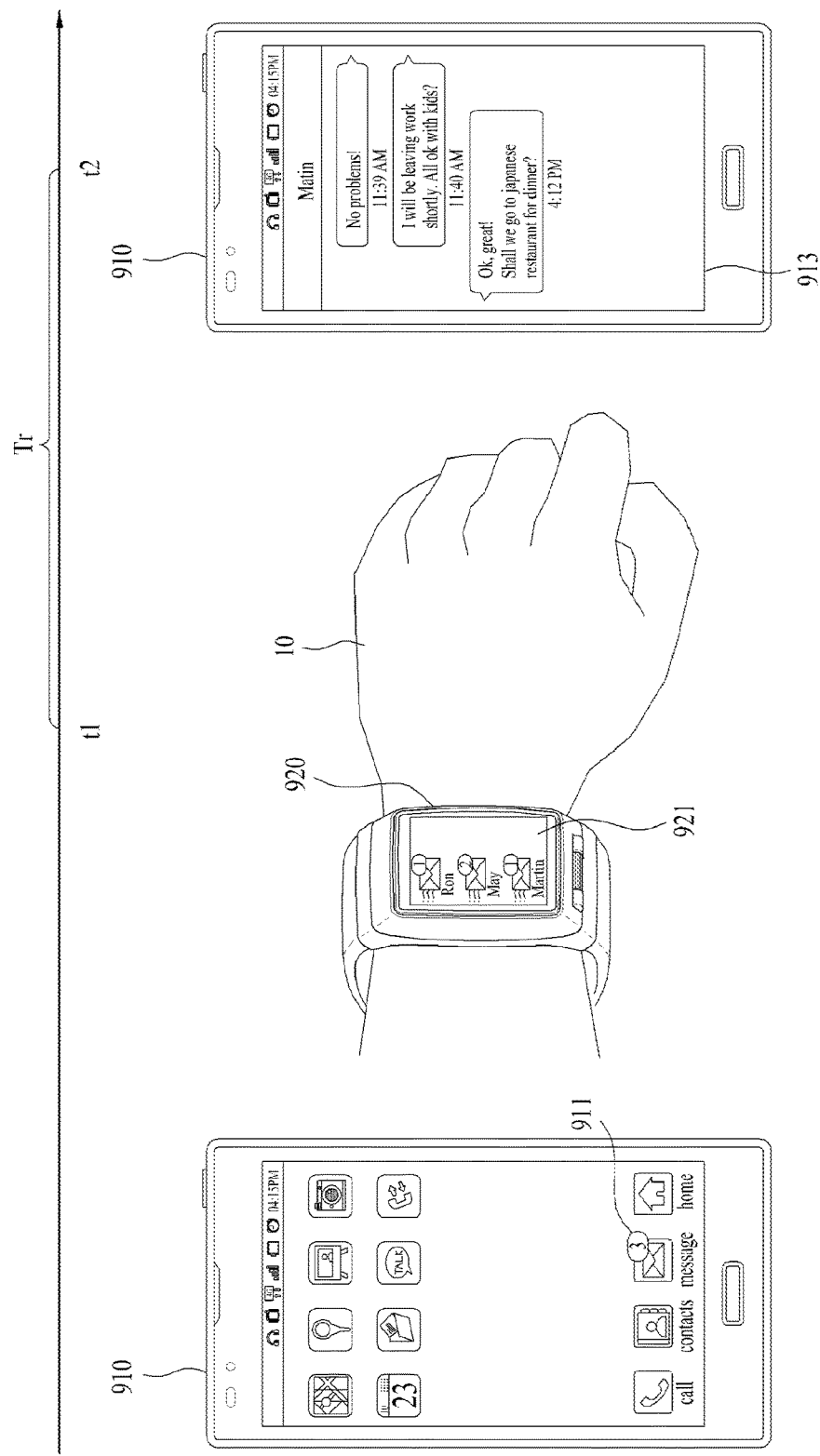
FIG. 9 is a diagram illustrating another example of a digital device that provides detail information of a plurality of events if a user identifies a notification through an external device.

FIG. 9 is a diagram illustrating another example of a digital device that provides detail information of a plurality of events if a user identifies a notification through an external device. In the same manner as FIG. 4, a text message receiving event will be described as a main embodiment. Also, in the same manner as FIG. 8, a plurality of events occurs in accordance with one embodiment.

The digital device 910 may detect occurrence of the event, and may generate a notification notifying the user that the event has occurred. The event may include a first event, a second event, and a third event, which occur in due order. Accordingly, the notification may include a first notification corresponding to the first event, a second notification corresponding to the second event, and a third notification corresponding to the third event. The notification notifying the event occurrence in the form of vibration or alarm sound may be provided by being divided into the first notification, the second notification and the third notification in accordance with the occurrence of the event.

However, the user may not identify the notification provided by the digital device 910 immediately. As a result, as shown in FIG. 9, the digital device 910 may provide one notification 911, which includes accumulated information of the occurring event, without dividing the notification into the first notification, the second notification and the third notification.

Also, the digital device 910 according to one embodiment may transmit the notification to the external device 920 paired therewith, whereby the user may conveniently identify the notification through another external device at any time. Accordingly, the digital device 910 may transmit the notification to the external device 920.

At this time, unlike the description in FIG. 7, the external device 920 may provide the notification 921 by dividing the notification into a first notification, a second notification, and a third notification to correspond to the order of the occurrence of the event.

At this time, if the user 10 identifies the notification 921 through the external device 920, the external device 920 may transmit the acknowledgement signal to the digital device 910 (time t1). Since this has been described with reference to FIG. 4, its detailed description will be omitted.

At this time, if the user 10 identifies the notification 921 through the external device 920, the external device 920 may transmit the acknowledgement signal to the digital device 910 (time t1). Since the acknowledgement signal has been described with reference to FIG. 7, its detailed description will be omitted.

If the digital device 910 receives the acknowledgement signal for the notification 921 from the external device 920 (time t1) and detects the input signal within a predetermined period Tr from the time when the acknowledgement signal is received, the digital device 910 may display detail information 913 for the event.

At this time, the detail information 913 for the event may be the detail information of the third event which occurs most recently. If the user 10 uses the digital device 910 within the predetermined period Tr after identifying the last notification 921 in a state that the user 10 does not respond to the plurality of notifications, it may be regarded that the user intends to view the detail information of the event corresponding to the last notification. Accordingly, if the digital device 910 detects its input signal (time t2), it may display the detail information of the latest event, to provide contents corresponding to the user's intention.

In the meantime, the predetermined period may be set to correspond to each event. In other words, the digital device 910 may count the first time, which is previously set from the time when the first notification corresponding to the first event is received from the external device, count the second time, which is previously set from the time when the second notification corresponding to the second event is received from the external device, and count the third time, which is previously set from the time when the third notification corresponding to the third event is received from the external device.

Accordingly, if the digital device 910 detects its input signal within the third time in excess of the first time and the second time, it may display the detail information 913 corresponding to the third event.

If the digital device 910 detects its input signal within the second time in excess of the first time, it may provide a user interface for selecting detail information corresponding to the second event and detail information corresponding to the third event. This is because that it is not clear whether the user intends to view detail information on the second event or detail information on the third event.

Figure 10:
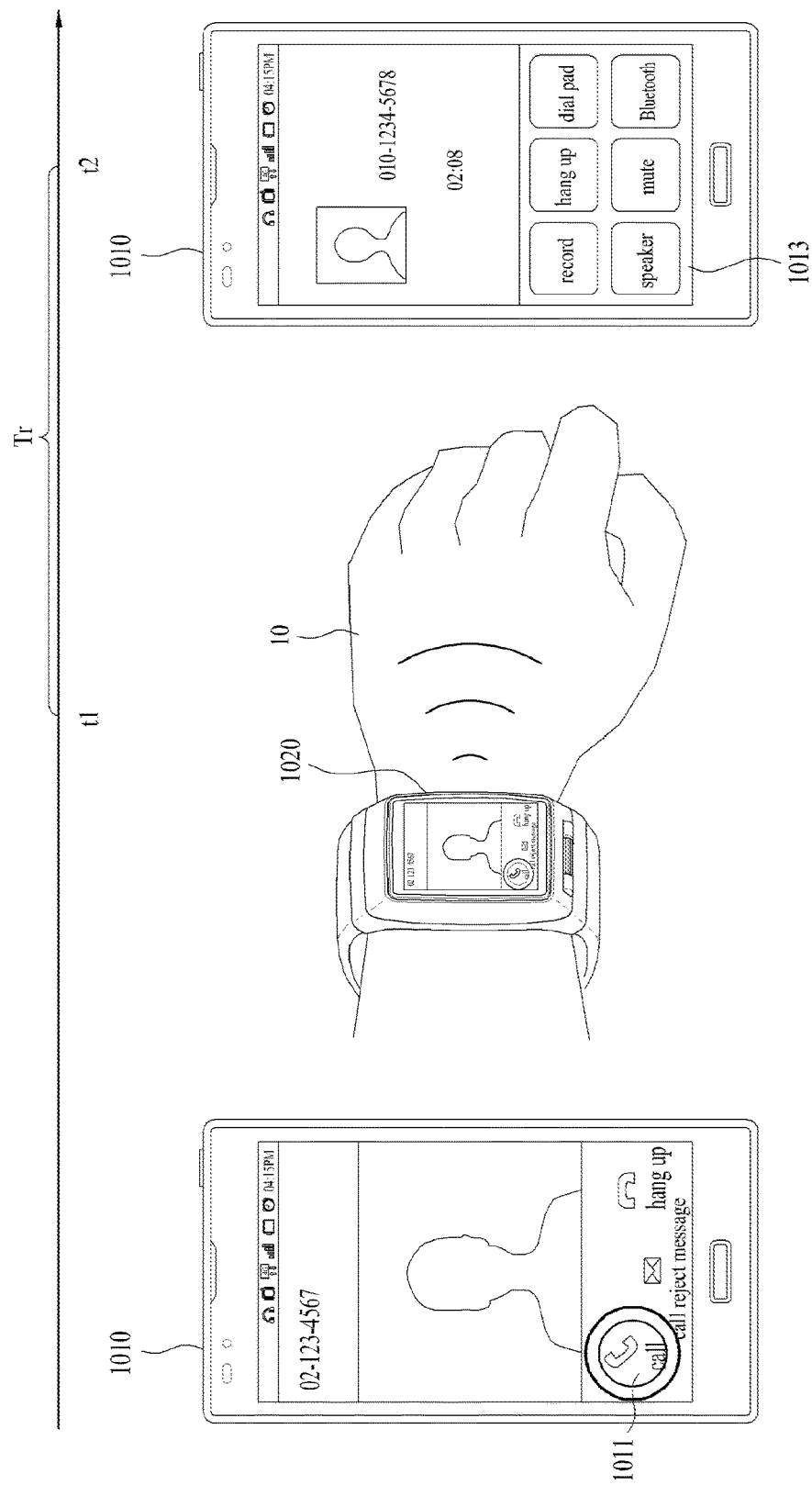
FIG. 10 is a diagram illustrating that a digital device unlocks a lock state automatically if a user identifies a notification through an external device.

FIG. 10 is a diagram illustrating that a digital device unlocks a lock state automatically if a user identifies a notification through an external device. In FIG. 10, a call receiving event will be described as a main embodiment of an event.

The digital device 1010 may detect occurrence of the event, and may generate a notification 1011 notifying the user that the event has occurred. Visual information and hearing information (for example, bell sound) may be provided as the notification 1011 at the same time. The notification 1011 is not limited to the visual information and the hearing information.

Also, as described with reference to FIG. 4, the digital device 1010 may transmit the notification to the external device 1020 paired therewith. Accordingly, the user may identify the notification through the external device 1020.

At this time, if the user 10 identifies the notification through the external device 1020, the external device 1020 may transmit the acknowledgement signal to the digital device 1010 (time t1). Since the acknowledgement signal has been described with reference to FIG. 4, its detailed description will be omitted.

If the digital device 1010 receives the acknowledgement signal for the notification from the external device 1020 (time t1) and detects the input signal within a predetermined period Tr from the time when the acknowledgement signal is received, the digital device 1010 may unlock its lock state automatically as shown in FIG. 10. In this way, the digital device 1010 may unlock the lock state automatically and display detail information 1013 for the event. The detail information 1013 for the event may include caller information and caller's number for the call receiving event. Also, although the detail information for the event is shown in FIG. 10 as the state that a call is received, the detail information may be a user interface for receiving a call.

In the meantime, if the user 10 identifies the notification transmitted to the external device 1020 and uses the digital device 1010 within the predetermined period Tr, it may be regarded that the user intends to identify contents of the notification. Accordingly, if the digital device 1010 detects its input signal (time t2), it may unlock the lock state automatically, whereby the user may immediately view the detail information for the event. As a result, the digital device 1010 may improve convenience of the user.

As described above, if the digital device 1010 unlocks the lock state immediately, security may be a problem. However, the digital device 1010 is paired with the external device 1020 and may identify the user through face recognition, fingerprint recognition, etc. when detecting the input signal. Accordingly, the digital device 1010 according to one embodiment may reinforce security even though it unlocks the lock state immediately.

However, the digital device 1010 may provide an unlock interface for unlocking the lock state in accordance with the user's selection or setting without unlocking the lock state immediately.

Figure 11:
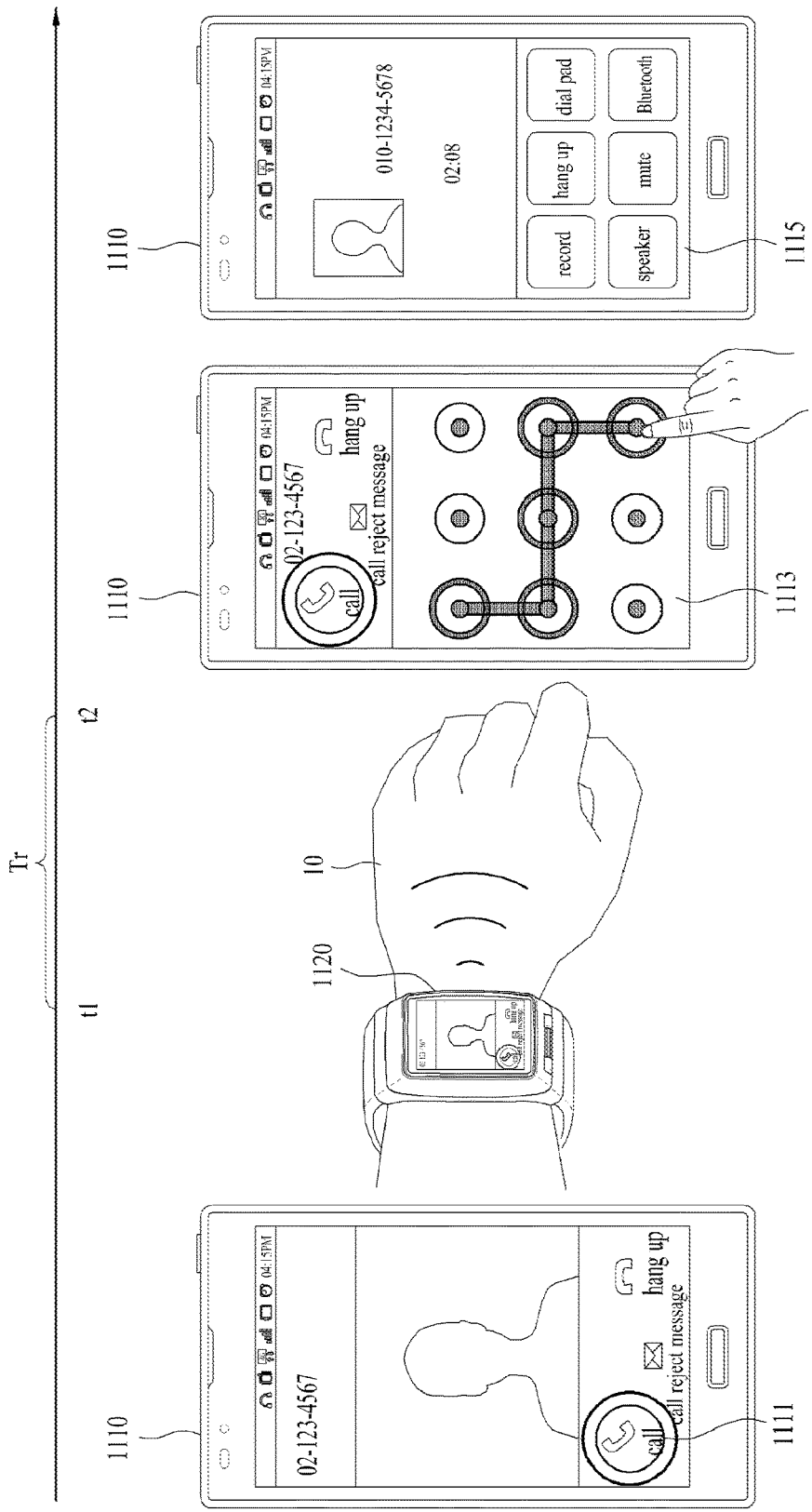
FIG. 11 is a diagram illustrating that a digital device provides an unlock interface for unlocking a lock state if a user identifies a notification through an external device.

FIG. 11 is a diagram illustrating that a digital device provides an unlock interface for unlocking a lock state if a user identifies a notification through an external device. In the same manner as FIG. 10, a call receiving event will be described as a main embodiment of an event. However, the event is not limited to the call receiving event.

The digital device 1110 may detect occurrence of the event, and may generate a notification 1111 notifying the user that the event has occurred. Visual information and hearing information (for example, bell sound) may be provided as the notification 1111 at the same time. The notification 1111 is not limited to the visual information and the hearing information.

Also, as described with reference to FIG. 4, the digital device 1110 may transmit the notification to the external device 1120 paired therewith. Accordingly, the user may identify the notification through the external device 1120.

At this time, if the user 10 identifies the notification through the external device 1120, the external device 1120 may transmit the acknowledgement signal to the digital device 1110 (time t1). Since the acknowledgement signal has been described with reference to FIG. 4, its detailed description will be omitted.

If the digital device 1110 receives the acknowledgement signal for the notification from the external device 1120 (time t1) and detects the input signal after a predetermined period Tr from the time when the acknowledgement signal is received, the digital device 1110 may provide an unlock interface 1113 for unlocking the lock state of the digital device 1110 as shown in FIG. 11.

Accordingly, if the user unlocks the lock state of the digital device 1110 through the unlock interface 1113, the digital device 1110 may provide detail information 1115 for the event. Since the call receiving event requires the user's immediate response, if the call receiving event is occurring even after the lock state is unlocked through the unlock interface 1113, it is more convenient for the user that the detail information 1115 for the event is provided.

In case of another type event unlike the call receiving event, if the user unlocks the lock state through the unlock interface 1113, the digital device 1110 may provide occurrence information for the event. In this case, since the user 10 uses the digital device 1110 after the predetermined period Tr, the digital device 1110 may display only the occurrence information for the event and provide detail information only if the user desires to view the detail information.

Figure 12:
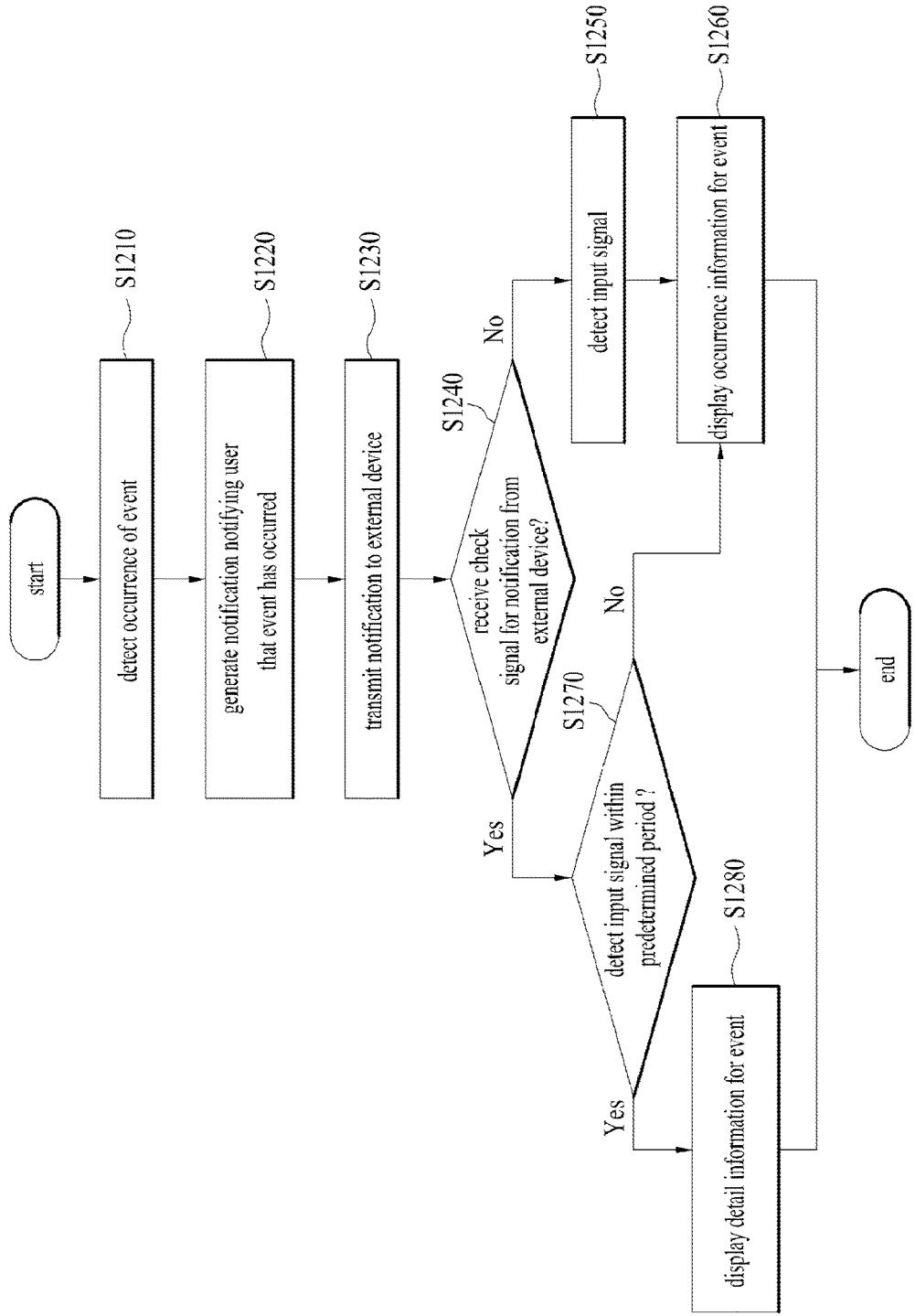
FIG. 12 is a flow chart illustrating a method for controlling a digital device according to one embodiment.

FIG. 12 is a flow chart illustrating a method for controlling a digital device according to one embodiment.

First of all, the digital device may detect occurrence of an event (S1210). As described above, the event may include at least one of a text message receiving event, a mail receiving event, a call receiving event, and a schedule notification event.

As described with reference to FIG. 4 to FIG. 11, the digital device may generate a notification notifying the user that the event has occurred (S1220). The notification may include at least one of hearing information, visual information, tactile information and vibration information. Also, if a plurality of events are provided, a plurality of notifications may be provided. However, the digital device may provide one notification corresponding to a plurality of events depending on the user's identification.

As described with reference to FIG. 4 to FIG. 11, the digital device may transmit the notification to the external device (S1230). The external device is paired with the digital device as described with reference to FIG. 2 and FIG. 3.

The digital device may determine whether a check signal for the notification has been received from the external device (S1240). The acknowledgement signal is generated if the external device detects that the user identifies the notification transmitted to the external device, and has been described with reference to FIG. 4.

As described with reference to FIG. 5, if the digital device does not receive the acknowledgement signal from the external device, it may detect an input signal (S1250). The input signal may be generated if the display unit of the digital device is turned on or if the user's gaze to the digital device or the predetermined motion of the user is detected. Also, the input signal may be generated if the digital device detects a touch input for a graphic object corresponding to the notification.

In this case, the digital device may display occurrence information for the event regardless of the fact that the external device detects whether the user has identified the notification (S1260). The occurrence information for the event may include at least one of a graphic object corresponding to the event, title information of the event, accumulated information of occurrence of the event, subject information of the event, and time information for the occurrence of the event.

In the meantime, if the digital device receives the acknowledgement signal for the notification from the external device, the digital device may determine whether it has detected the input signal within the predetermined period from the time when the acknowledgement signal is received (S1270).

As described with reference to FIG. 4, if the digital device detects the input signal within the predetermined period from the time when the acknowledgement signal is received, the digital device may display detail information for the event (S1280).

However, as described with reference to FIG. 6, if the digital device detects the input signal after the predetermined period from the time when the acknowledgement signal is received, the digital device may display occurrence information for the event (S1260).

Although the description may be made for each of the drawings for convenience of description, the embodiments of the respective drawings may be incorporated to achieve a new embodiment. Also, a computer readable recording medium where a program for implementing the embodiments is recorded may be designed in accordance with the need of the person skilled in the art within the scope of the present specification.

Also, the digital device and the method for controlling the same are not limited to the aforementioned embodiments, and all or some of the aforementioned embodiments may selectively be configured in combination so that various modifications may be made in the aforementioned embodiments.

In the meantime, the method for controlling the digital device may be implemented in a recording medium, which can be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Also, in this specification, both the product invention and the method invention have been described, and description of both inventions may be made complementally if necessary.

What is claimed is:

1. A digital device paired with an external smart watch, the digital device comprising:
   a sensor unit;
   a touchscreen unit configured to display detail information of at least one event; and
   a processor configured to control the touchscreen unit, wherein the processor is further configured to:
   detect occurrences of a plurality of events, which occur sequentially;
   generate a notification notifying a user that the plurality of events has occurred;
   transmit information related to the notification to the external smart watch which provides the user with the notification of the plurality of events;
   count a first predetermined time from a time when a first notification corresponding to a first event among the plurality of events is received from the external smart watch, a second predetermined time from a time when a second notification corresponding to a second event among the plurality of events is received from the external smart watch, a third predetermined time from a time when a third notification corresponding to a third event among the plurality of events is received from the external smart watch;
   display detail information corresponding to the third event, if a predetermined motion of the digital device is detected using the sensor unit within the third predetermined time in excess of the first predetermined time and the second predetermined time;
   provide a user interface for selecting detail information corresponding to the second event and detail information corresponding to the third event, if the predetermined motion of the digital device is detected using the sensor unit within the second predetermined time in excess of the first predetermined time; and
   display detail information selected from the user interface.

2. The digital device according to claim 1, wherein the notification includes at least one of hearing information, visual information, tactile information and vibration information.

3. The digital device according to claim 2, wherein, if the notification includes the visual information, the visual information includes at least one of a graphic object corresponding to the event, title information of the event, accumulated information of an occurrence of the event, subject information of the event, and time information for the occurrence of the event.

4. The digital device according to claim 1, wherein the event includes at least one of a text message receiving event, a mail receiving event, a call receiving event, and a schedule notification event.

5. The digital device according to claim 1, wherein the detail information for the event includes at least one of contents of a text message, contents of a mail, caller information, and contents of a schedule corresponding to the event.

6. The digital device according to claim 1, wherein the detail information for the event includes at least one of a graphic object corresponding to the event, title information of the event, accumulated information of an occurrence of the event, subject information of the event, and time information for the occurrence of the event.

7. The digital device according to claim 1, wherein the acknowledgement signal is generated if the external smart watch detects that the user checks the notification transmitted to the external smart watch according to a predetermined method.

8. The digital device according to claim 1, wherein the input signal is generated if the touchscreen unit of the digital device is turned on.

9. The digital device according to claim 1, wherein the input signal is generated if the digital device detects a touch input of the user for a graphic object corresponding to the notification.

10. The digital device according to claim 1, wherein the processor displays predetermined background image of the digital device together with occurrence information of the notification.

11. The digital device according to claim 1, wherein the external smart watch provides an indicator indicating the predetermined period from a current time.

12. A method for controlling a digital device paired with an external smart watch, the digital device having a processor and a sensor unit, the method comprising:
   detecting, via the processor, occurrences of a plurality of events, which occur sequentially;
   generating, via the processor, a notification notifying a user that the plurality of events has occurred;
   transmitting, via the processor, information related to the notification to the external smart watch which provides the user with the notification of the plurality of events;
   counting, via the processor, a first predetermined time from a time when a first notification corresponding to a first event among the plurality of events is received from the external smart watch, a second predetermined time from a time when a second notification corresponding to a second event among the plurality of events is received from the external smart watch, a third predetermined time from a time when a third notification corresponding to a third event among the plurality of events is received from the external smart watch;
   displaying, via the processor, detail information corresponding to the third event, if a predetermined motion of the digital device is detected using the sensor unit within the third predetermined time in excess of the first predetermined time and the second predetermined time;
   providing, via the processor, a user interface for selecting detail information corresponding to the second event and detail information corresponding to the third event, if the predetermined motion of the digital device is detected using the sensor unit within the second predetermined time in excess of the first predetermined time; and displaying, via the processor, detail information selected from the user interface.

* * * * *